(12) United States Patent
Wong et al.

(10) Patent No.: US 10,778,315 B2
(45) Date of Patent: Sep. 15, 2020

(54) TERMINAL DEVICE, INFRASTRUCTURE EQUIPMENT, METHODS AND INTEGRATED CIRCUITRY

(71) Applicant: Sony Corporation, Minato-ku, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 77 days.

(21) Appl. No.: 16/075,538

(22) PCT Filed: Feb. 3, 2017

(86) PCT No.: PCT/EP2017/052462
§ 371 (c)(1),
(2) Date: Aug. 3, 2018

(87) PCT Pub. No.: WO2017/134273
PCT Pub. Date: Aug. 10, 2017

(65) Prior Publication Data
US 2019/0372637 A1    Dec. 5, 2019

(30) Foreign Application Priority Data
Feb. 5, 2016  (EP) .................................... 16154577

(51) Int. Cl.
*H04B 7/06* (2006.01)
*H04L 1/06* (2006.01)
*H04L 5/00* (2006.01)

(52) U.S. Cl.
CPC ........... *H04B 7/068* (2013.01); *H04B 7/0617* (2013.01); *H04L 1/0606* (2013.01); *H04L 5/0048* (2013.01)

(58) Field of Classification Search
CPC ..... H04B 7/068; H04B 7/0617; H04L 1/0606; H04L 5/0048
See application file for complete search history.

(56) References Cited

U.S. PATENT DOCUMENTS 7,265,731 B2 *  9/2007  Vance .................. H01Q 9/0421
                                                            333/32
7,555,276 B2 *  6/2009  Wilcox ................ H04B 1/0458
                                                            455/126

(Continued)

OTHER PUBLICATIONS

International Search Report and Written Opinion for PCT/EP2017/052462 dated Apr. 25, 2017.

(Continued)

*Primary Examiner* — James M Perez
(74) *Attorney, Agent, or Firm* — Xsensus LLP

(57) ABSTRACT

A terminal device, infrastructure equipment, methods and integrated circuitry for use with a wireless telecommunications network. The terminal device comprises a receiver configured to receive a first signal, the first signal being transmitted using a first number of antenna ports and encoded according to the first number of antenna ports, the first number of antenna ports being predetermined, and to receive a second signal, the second signal being transmitted using a second number of antenna ports and encoded according to the second number of antenna ports, the second number of antenna ports being indicated by the first signal. The terminal device also comprises a controller that configures the receiver to decode the first signal using the predetermined first number of antenna ports, and decode the second signal using the second number of antenna ports indicated by the first signal.

19 Claims, 10 Drawing Sheets

(56) References Cited

U.S. PATENT DOCUMENTS

| | | | | |
|---|---|---|---|---|
| 7,917,096 B2* | 3/2011 | Wilcox | H04B 1/18 | 333/124 |
| 8,005,504 B2* | 8/2011 | Sano | H04B 7/0805 | 455/552.1 |
| 8,055,216 B2* | 11/2011 | Dent | H01Q 1/246 | 333/109 |
| 8,581,792 B2* | 11/2013 | Mukai | H01Q 1/46 | 343/702 |
| 8,908,802 B2* | 12/2014 | Zhang | H04B 7/0617 | 375/299 |
| 9,467,264 B2* | 10/2016 | Seo | H04L 5/0023 | |
| 9,496,942 B2* | 11/2016 | Ko | H04L 1/0028 | |
| 9,553,643 B2* | 1/2017 | Chen | H04B 7/0456 | |
| 9,608,772 B2* | 3/2017 | Kwak | H04L 5/0007 | |
| 9,787,379 B2* | 10/2017 | Onggosanusi | H04B 7/0456 | |
| 9,942,541 B2* | 4/2018 | McCoy | H04N 13/194 | |
| 10,136,432 B2* | 11/2018 | Beale | H04W 72/0446 | |
| 10,149,191 B2* | 12/2018 | Takano | H04W 72/0453 | |
| 10,250,428 B2* | 4/2019 | Atungsiri | H04L 1/04 | |
| 10,305,612 B2* | 5/2019 | Takano | H04W 16/28 | |
| 10,447,517 B2* | 10/2019 | Sadiq | H04L 5/0023 | |
| 10,461,909 B2* | 10/2019 | Beale | H04L 5/0023 | |
| 10,505,689 B2* | 12/2019 | Xiong | H04L 1/0061 | |
| 10,512,073 B2* | 12/2019 | Bendlin | H04L 5/0053 | |
| 10,530,432 B2* | 1/2020 | Mizusawa | H04B 7/0469 | |
| 10,554,358 B2* | 2/2020 | Suzuki | H04L 5/0007 | |
| 10,594,414 B2* | 3/2020 | Xu | H04W 4/12 | |
| 10,624,088 B2* | 4/2020 | Beale | H04W 72/0446 | |
| 10,630,363 B2* | 4/2020 | Xu | H04B 7/063 | |
| 2007/0129104 A1* | 6/2007 | Sano | H04W 52/42 | 455/553.1 |
| 2007/0142014 A1* | 6/2007 | Wilcox | H01P 1/185 | 455/276.1 |
| 2008/0238789 A1* | 10/2008 | Wilcox | H04B 1/0458 | 343/750 |
| 2011/0149886 A1* | 6/2011 | Xu | H04B 7/0628 | 370/329 |
| 2013/0121249 A1* | 5/2013 | Ji | H04W 4/06 | 370/328 |
| 2014/0152784 A1* | 6/2014 | McCoy | H04N 13/167 | 348/52 |
| 2015/0055485 A1* | 2/2015 | Kim | H04L 1/0061 | 370/242 |
| 2015/0373668 A1* | 12/2015 | Lee | H04L 5/0092 | 370/329 |
| 2016/0057645 A1* | 2/2016 | Takano | H04W 72/0453 | 370/252 |
| 2017/0279472 A1* | 9/2017 | Wong | H04L 1/08 | |
| 2017/0338907 A1* | 11/2017 | Atungsiri | H03M 13/2707 | |
| 2018/0049192 A1* | 2/2018 | Beale | H04B 7/0617 | |
| 2018/0062711 A1* | 3/2018 | Mizusawa | H04B 7/0626 | |
| 2018/0131491 A1* | 5/2018 | Xiong | H04L 1/0067 | |
| 2018/0159641 A1* | 6/2018 | Xu | H04W 64/00 | |
| 2018/0167946 A1* | 6/2018 | Si | H04W 72/1252 | |
| 2018/0234278 A1* | 8/2018 | Xu | H04L 27/2613 | |
| 2018/0248667 A1* | 8/2018 | Beale | H04L 5/0023 | |
| 2018/0287680 A1* | 10/2018 | Xu | H04B 17/309 | |
| 2018/0287722 A1* | 10/2018 | Takano | H04B 7/088 | |
| 2019/0029005 A1* | 1/2019 | Bendlin | H04L 5/0053 | |
| 2019/0090237 A1* | 3/2019 | Beale | H04L 1/0004 | |
| 2019/0253161 A1* | 8/2019 | Takano | H04L 5/0048 | |
| 2019/0288754 A1* | 9/2019 | Bai | H04B 1/44 | |
| 2019/0335428 A1* | 10/2019 | Bendlin | H04L 5/0053 | |
| 2019/0372637 A1* | 12/2019 | Wong | H04L 5/0048 | |
| 2019/0387491 A1* | 12/2019 | Han | G01S 5/0036 | |
| 2020/0052842 A1* | 2/2020 | Rico Alvarino | H04L 25/0224 | |
| 2020/0091972 A1* | 3/2020 | Mizusawa | H04W 72/046 | |

OTHER PUBLICATIONS

Holma, H., et al., "LTE for UMTS: OFDMA and SC-FDMA Based Radio Access", Wiley, 8 Pages total, (2009).

Qualcomm Incorporated, "RP-151621—New Work Item: NarrowBand IOT (NB-IOT)", 3GPP TSG RAN Meeting #69, Phoenix, USA, 8 Pages total, (Sep. 14-16, 2015).

CMCC, et al., "R1-157783—Way Forward on NB-IoT", 3GPP TSG RAN WG1 #83, Anaheim, USA, 3 Pages total, (Nov. 15-22, 2015).

* cited by examiner

TERMINAL DEVICE, INFRASTRUCTURE EQUIPMENT, METHODS AND INTEGRATED CIRCUITRY

BACKGROUND

The present application claims the priority under the Paris convention of European patent application 16154577.7, the contents of which are herein incorporated by reference.

FIELD OF DISCLOSURE

The present disclosure relates to a terminal device, infrastructure equipment, methods and integrated circuitry.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

In one aspect, the present technique provides a terminal device for use with a wireless telecommunications network, the terminal device comprising: a receiver configured to receive a first signal, the first signal being transmitted using a first number of antenna ports and encoded according to the first number of antenna ports, the first number of antenna ports being predetermined, and to receive a second signal, the second signal being transmitted using a second number of antenna ports and encoded according to the second number of antenna ports, the second number of antenna ports being indicated by the first signal; and a controller configured to decode the first signal using the predetermined first number of antenna ports, and decode the second signal using the second number of antenna ports indicated by the first signal.

In another aspect, the present technique provides infrastructure equipment for use with a wireless telecommunications network, the infrastructure equipment comprising a controller; and a transmitter configured to transmit a first signal to a terminal device of the wireless telecommunications network, the first signal being transmitted using a first number of antenna ports and being encoded by the controller according to the first number of antenna ports, the first number of antenna ports being predetermined, and to transmit a second signal to the terminal device of the wireless telecommunications network, the second signal being transmitted using a second number of antenna ports and being encoded by the controller according to the second number of antenna ports, the second number of antenna ports being indicated by the first signal.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
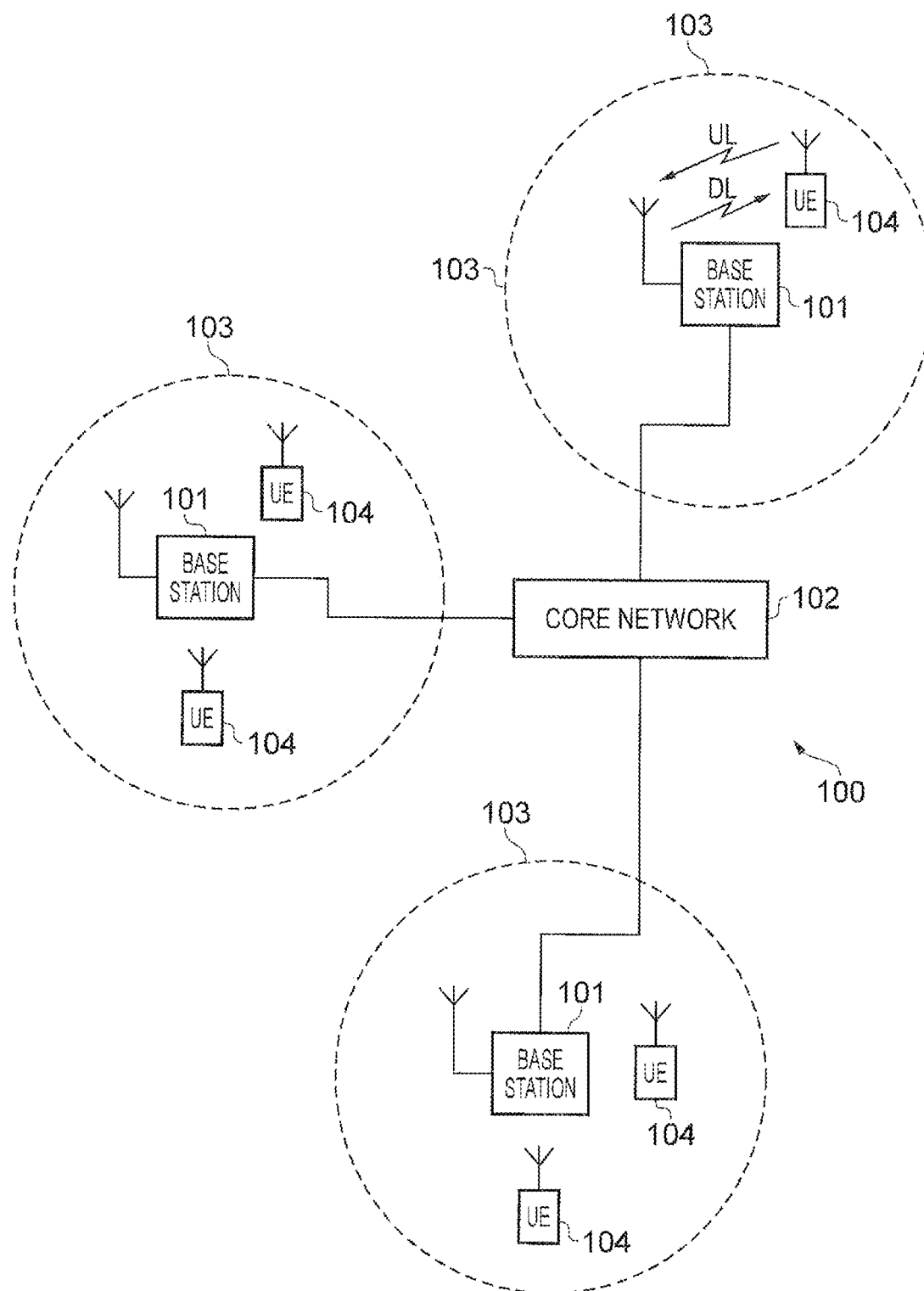
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. A communications device may also be referred to as a mobile station, user equipment (UE), user device, mobile radio, terminal device and so forth. A base station may also be referred to as a transceiver station, NodeB, eNodeB (eNB for short), infrastructure equipment and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
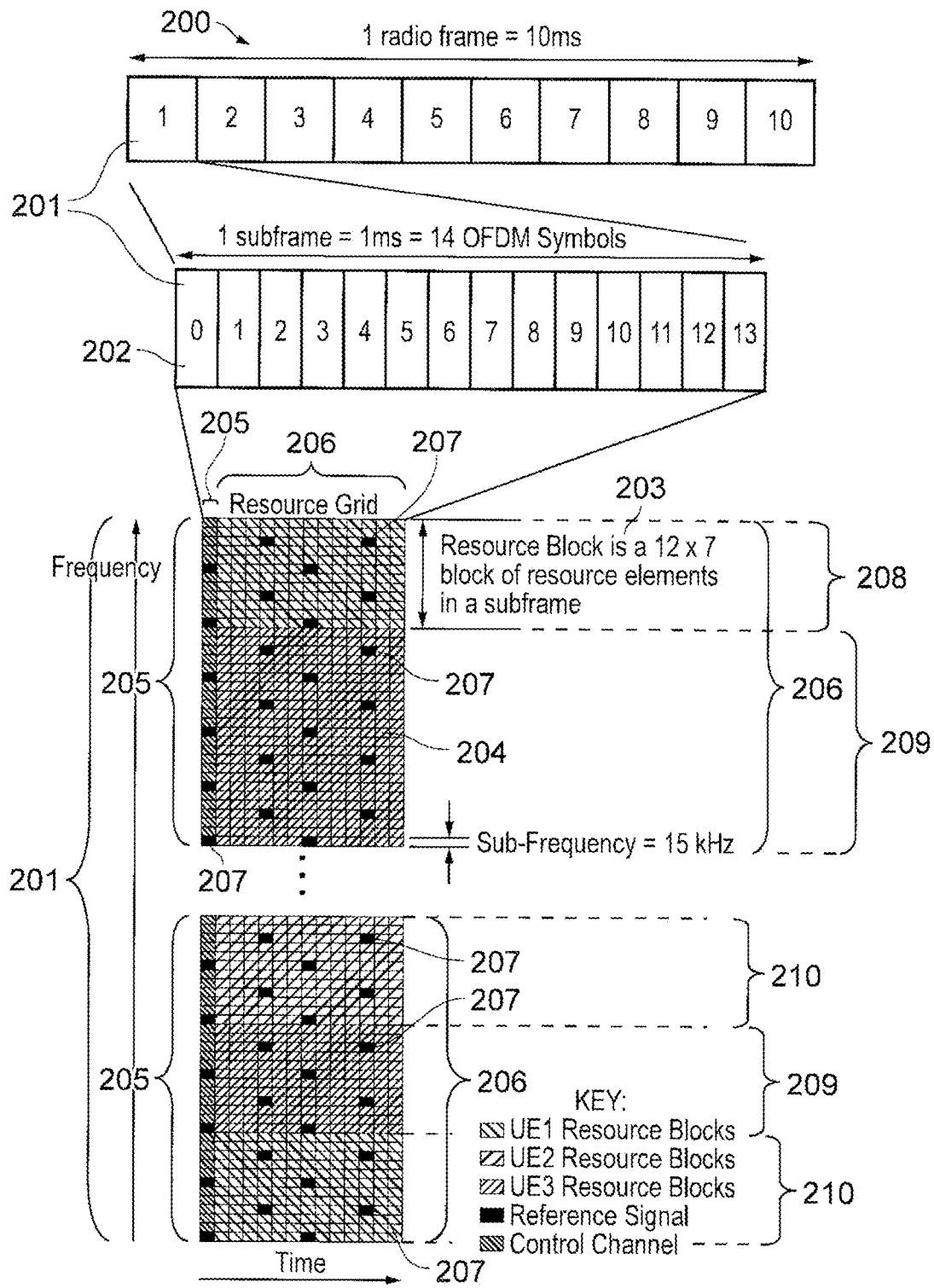
FIG. 2 is a schematic representation illustrating a frame structure of a down-link of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into 128 to 2048 orthogonal subcarriers for example Each subcarrier bandwidth may take any value but in LTE it is conventionally fixed at 15 kHz. However it has been proposed in the future [2] [3] to provide also a reduced subcarrier spacing of 3.75 kHz for certain parts of the LTE wireless access interface for either the uplink or the downlink or both. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
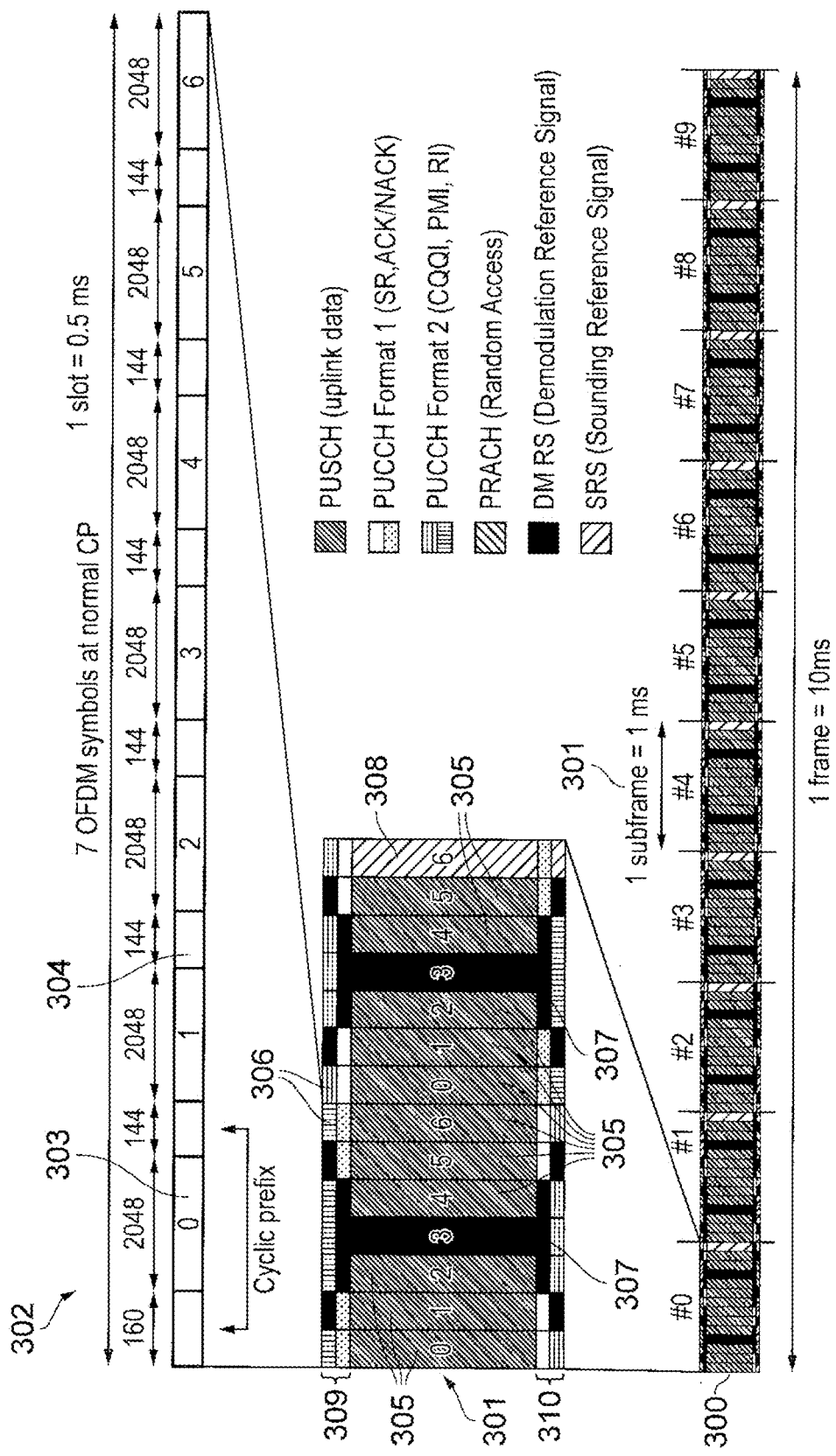
FIG. 3 is a schematic representation illustrating a frame structure of an up-link of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE up-link represented in FIG. 3 are provided in Annex 1.

Narrowband Internet of Things

Figure 4:
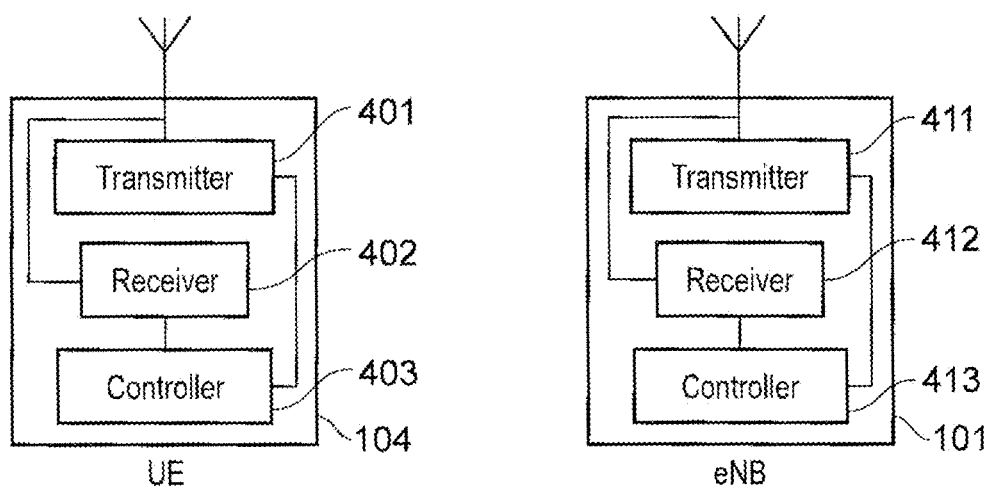
FIG. 4 is a schematic block diagram of a communications device and an infrastructure equipment.

As explained above, it has been proposed to develop an adaptation of a mobile communications network to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) wireless access interface was agreed [2]. This project is aimed at improved indoor coverage, support for a massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilizing for example the spectrum currently being used by GERAN systems as a replacement of one or more GSM carriers 2. 'Guard band operation' utilizing the unused resource blocks within a LTE carrier's guard-band
3. 'In-band operation' utilizing resource blocks within a normal LTE carrier FIG. 4 provides an example schematic block diagram of a terminal device or UE 104 and a infrastructure equipment or eNB 101. As shown in FIG. 4, the UE 104 includes a transmitter 401 and a receiver 402 (which together form a transceiver) which are controlled by a controller 403. Correspondingly, the eNB 101 includes a transmitter 411 and a receiver 412 (which together form a transceiver) which are controlled by a controller 413 (which can also implement a scheduler function). As explained above, the UE 104 transmits and receives signals to and from the eNB 101 via a wireless access interface provided by the eNB as part of the wireless communications network. Each of the UE 104 and eNB 101 are configured to exchange signals with each other using NB-IoT.

When the UE 104 is first turned on, it will try to search for a network by searching and decoding the NB-IoT synchronisation channels. These are NB-PSS (Narrowband Primary Synchronization Signal) and NB-SSS (Narrowband Secondary Synchronization Signal). By decoding the NB-PSS & NB-SSS, the UE obtains synchronisation with the eNB and determines the PCID (Physical Cell ID) of the eNB 101. The UE then decodes the NB-PBCH (Narrowband Physical Broadcast Channel).

Figure 5:
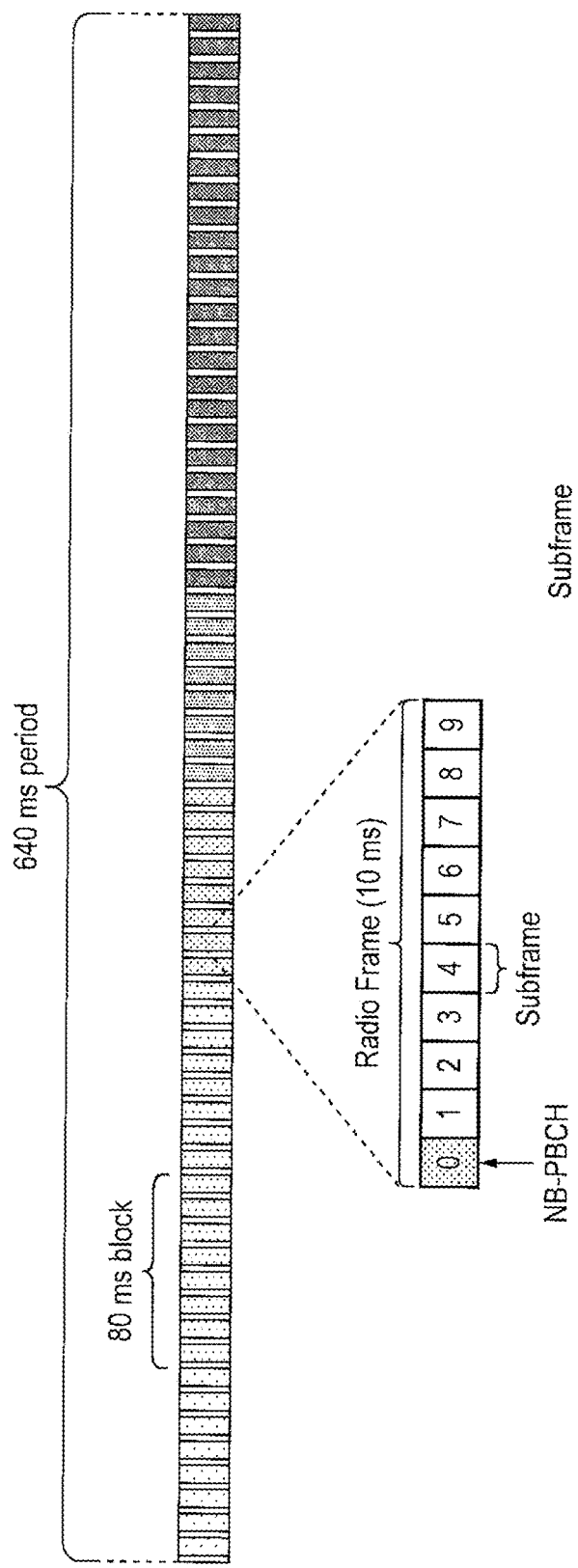
FIG. 5 is a schematic representation of the structure of a Narrowband Physical Broadcast Channel (NB-PBCH)

The NB-PBCH structure is schematically shown in FIG. 5. The NB-PBCH has a period (that is, a duration in time in which the contents of the NB-PBCH does not change) of 640 ms (64 radio frames). The 640 ms NB-PBCH period consists of eight 80 ms blocks, wherein each block can be decoded independently of the other blocks. Each 80 ms block consists of 8 radio frames, wherein the NB-PBCH is transmitted in subframe 0 of each radio frame. Since the contents of the NB-PBCH do not change within the 640 ms period, the UE 104 can accumulate the energy of the NB-PBCH signal in the NB-PBCH period to improve the SNR for decoding. This accumulation of energy is beneficial when the UE is in a poor network coverage area, for example. When the UE is in a good network coverage area, it does not necessarily need all the 64 NB-PBCH samples, and can thus decode the NB-PBCH faster using fewer samples. For example, it may decode the NB-PBCH with just one block (comprising 8 NB-PBCH samples).

The NB-PBCH carries the MIB (master information block) and one of the pieces of information (among others) in the MIB is the SFN (System Frame Number). Each radio frame is identified by its SFN. Since the MIB does not change within the 640 ms NB-PBCH period (since the NB-PBCH does not change), the MIB contains partial SFN information. In particular, the MIB does not provide the 6 least significant bits of the SFN (note the radio frame is 10 ms long, hence the MIB takes 640/10=64 radio frames to transmit, and $2^6$=64, meaning that the 6 least significant bits of each radio frame cannot be indicated by the MIB) and the UE 104 has to determine these remaining bits. In order to do this, each of the 8 blocks is scrambled using a different sequence and hence they can be differentiated from each other. The UE then blind decodes each of these blocks by trying out all 8 possible scrambling sequences. Depending on the scrambling sequence which successfully decodes a particular block, the UE is able to determine which of the 8 blocks shown in FIG. 5 it has decoded and is thus able to identify the position of that block within the 640 ms period, determining the least significant bits of the SFN. The remaining six digits of the SFN of each radio frame of the block can then be determined by the UE from explicit signalling within the MIB.

Figure 6:
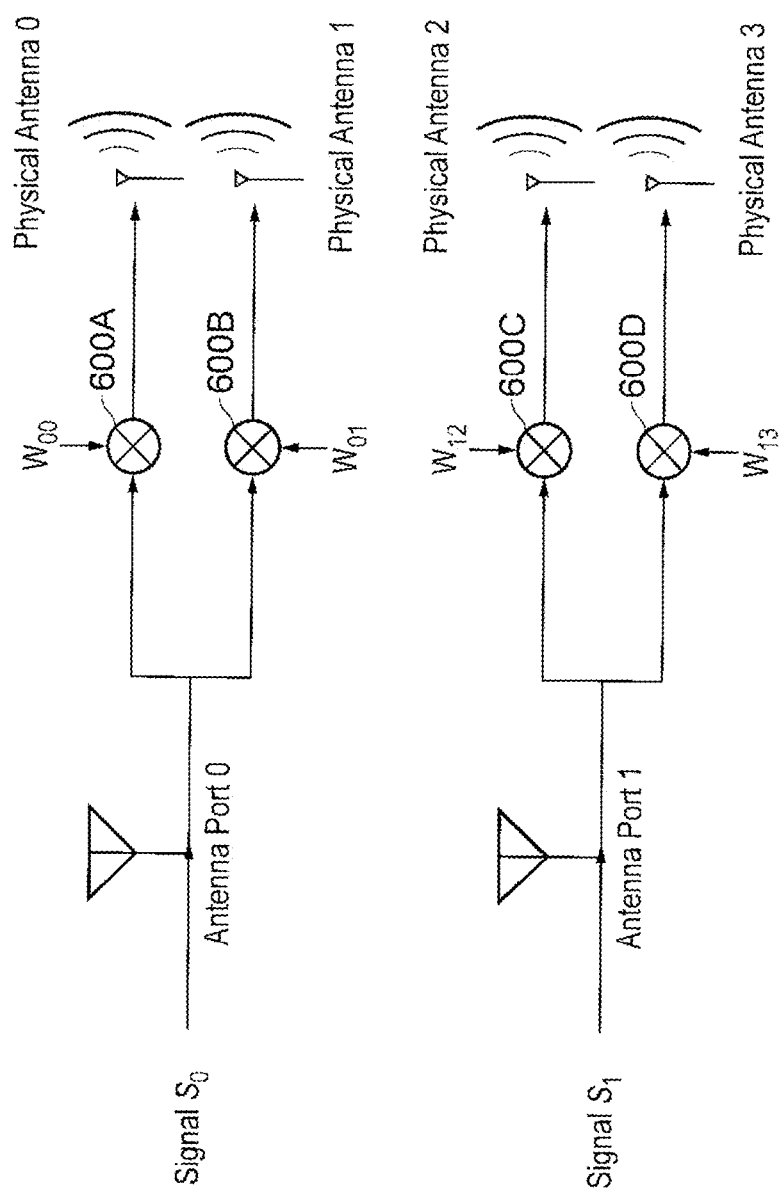
FIG. 6 is a schematic representation of a first arrangement of antenna ports and physical antennas.

In LTE the number of physical antennas and the number of Antenna Ports (AP) need not be the same. An AP is a logical entity and the signal from an AP can be transmitted over one or more physical antennas. For example the eNB 101 can have 4 physical antennas but only 2 APs, as schematically shown in FIG. 6. Here the signal $S_0$ from Antenna Port 0 (AP0) is transmitted over two physical antennas, Physical Antenna 0 and Physical Antenna 1. The eNB may apply some weights on the signal to each physical antenna, for example, $W_{00}$ and $W_{01}$ to Physical Antenna 0 and Physical Antenna 1, respectively. Similarly, signal $S_1$ from Antenna Port 1 (AP1) is transmitted via Physical Antenna 2 and Physical Antenna 3, with weight $W_{12}$ and $W_{13}$ applied to each respective physical antenna, for example. Each of the weights $W_{00}$, $W_{01}$, $W_{12}$ and $W_{13}$ are applied using multipliers 600A, 600B, 600C and 600D, respectively. In embodiments, the multipliers are complex multipliers. It will be appreciated that the mapping of APs to physical antennas and the weights used (if any) is an implementation consideration at the eNB 101. The UE 104 does not need to be aware of the number of physical antennas used. Rather, it needs to know only the number of APs used, and this is typically signalled or blind decoded by the UE.

Figure 7A:
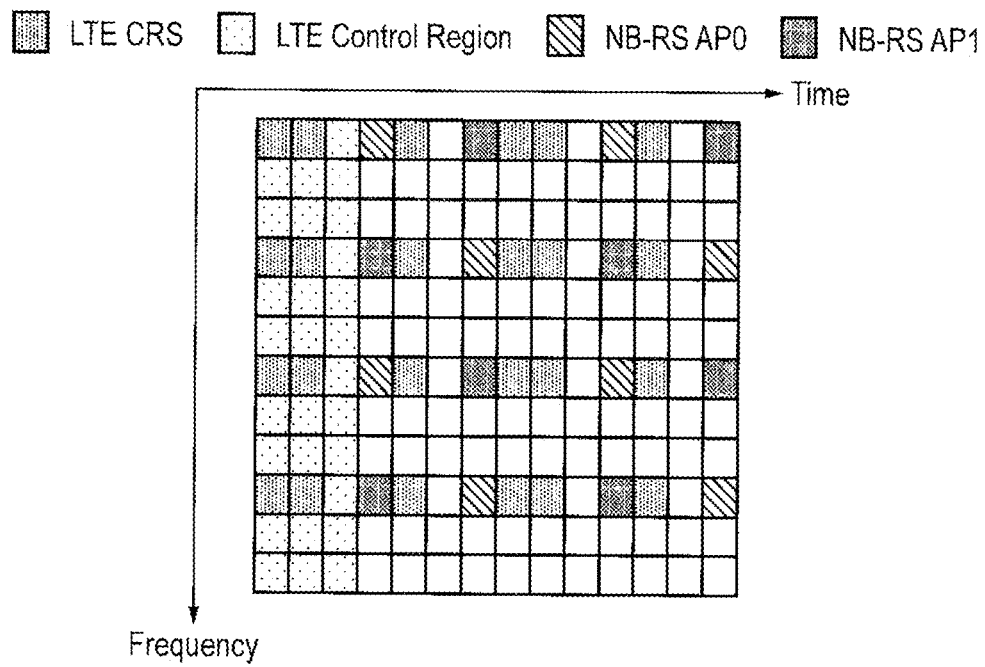
FIG. 7 is a schematic representation of a Narrow Band Internet of Things (NB-IoT) Physical Resource Block (PRB) comprising two sets of Narrow Band Reference Signals (NB-RS)

It was agreed in 3GPP that the NB-IoT eNB can use up to 2 APs. Each AP is represented by a set of NB-RS (Narrowband Reference Signals). Each set of NB-RS is used by the UE 104 to perform channel estimation of the signal associated with the corresponding AP. FIG. 7A shows a NB-IoT physical resource block (PRB) for inband operation which contains legacy LTE resource elements (REs) such as LTE cell-specific reference signals (CRS) and LTE Control Regions. An example of NB-RS locations for each antenna port, that is, AP0 and AP1, is shown in FIG. 7A. Here, 8 NB-RS (implemented using 8 REs of the PRB) are used to indicate the reference signal (RS) for each AP. It should be appreciated other NB-RS pattern may exist. An NB-IoT PRB for standalone or guardband operation modes may not contain the legacy LTE resource elements, but would still contain NB-RS.

It was agreed in 3GPP that if the number of APs used is 2, then a Space-Frequency Block Code (SFBC) transmission scheme is used. Otherwise (that is, if the number of APs used is 1), a single antenna port transmission scheme (such as LTE Transmission Mode #1 (LTE TM1)) is used. SFBC is based on Alamouti codes, which occupy a pair of frequency resources, in particular, two REs in adjacent subcarriers within the same OFDM symbol (that is, at the same time). An example is shown in FIG. 7B, in which a pair of REs, $RE_j$ and $RE_k$, that use adjacent subcarriers in the same OFDM symbol are used for SFBC.

Figure 7B:
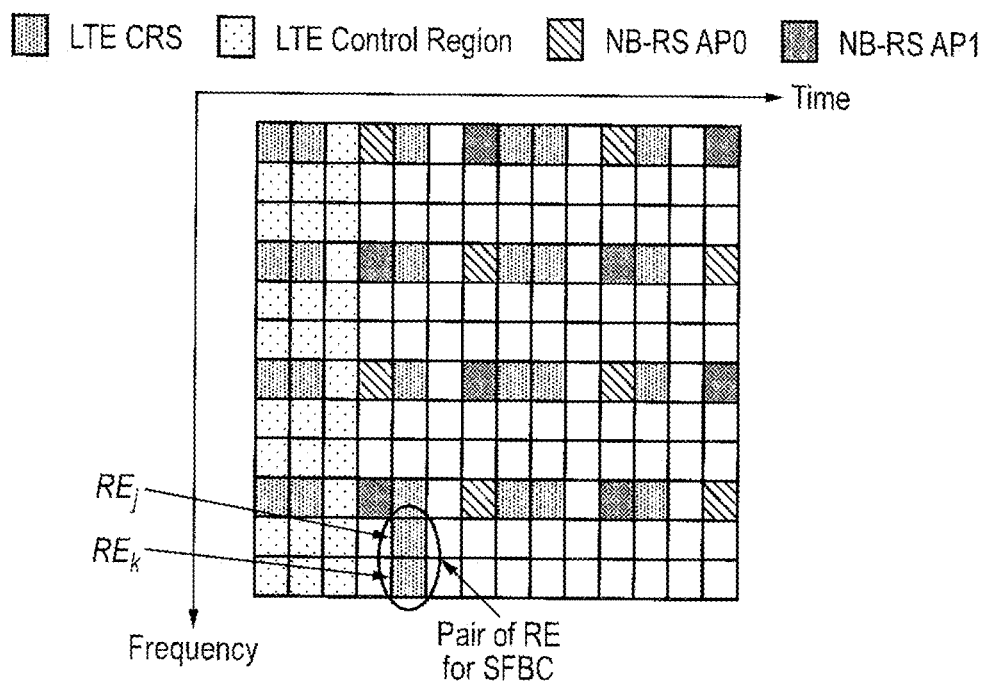

Assuming two symbols $x_0$ and $x_1$ are to be transmitted (wherein each symbol is a modulation symbol), and referring to FIG. 7B, the signal transmitted on AP0 ($S_0$) and AP1 ($S_1$) on each of $RE_j$ and $RE_k$ are as summarised in Table 1. Here $x_0^*$ and $x_1^*$ are the complex conjugates of $x_0$ and $x_1$, respectively.

TABLE 1

| SFBC Coding | | |
|---|---|---|
| AP | $RE_j$ | $RE_k$ |
| AP0 ($S_0$) | $x_0$ | $x_1$ |
| AP1 ($S_1$) | $-x_1^*$ | $x_0^*$ |

Since the UE 104 is not aware of the number of APs used when it is decoding the NB-PBCH, it has to blind decode for each possible configuration. That is, the UE must determine, by blind decoding, whether only NB-RS AP0 is present (indicating that only one AP has been used and therefore that a single antenna port transmission scheme has been used) or both NB-RS AP0 and NB-RS AP1 are present (indicating that two APs have been used and therefore that a SFBC transmission scheme has been used). The UE would therefore need to perform at least 16 blind decodes. That is, the UE must perform 8 blind decodes in order to determine which one of the 8 NB-PBCH blocks it is decoding, and for each of the 8 blind decodes, must perform 2 further blind decodes to determine which of the two possible numbers of APs are used (that is, whether AP0 only is used or whether AP0 & AP1 are used).

It is therefore desirable to reduce the number of blind decodes carried out by the UE 104. Such a reduction would allow the complexity of the UE to be reduced and would also reduce the time taken by the UE to decode the NB-PBCH and thereby connect to the network.

In an embodiment of the present technique, the number of APs used is fixed for the NB-PBCH regardless of the number of actual number of physical antennas or the number of APs used for other downlink channels at the eNB 101. The fixed number of APs used for the NB-PBCH is known to the UE 104. The need for the UE to blind decode in order to determine the number of APs is therefore removed.

In one embodiment, a different number of APs can be signalled to the UE (for example, using the master information block (MIB) transported by the NB-PBCH) that the eNB will use for one or more other channels (such as the Narrow Band Physical Downlink Control Channel (NB-PDCCH) and Narrow Band Physical Downlink Shared Channel (NB-PDSCH)). Thus, the number of APs used for transmitting the NB-PBCH is known to the UE in advance, allowing the NB-PBCH to be decoded without the need to first determine the number of APs used for transmitting the NB-PBCH using blind decoding. The number of APs used for one or more other channels can then be indicated to the UE by information included in the decoded NB-PBCH. Like with the transmission of the NB-PBCH, the eNB may transmit signals over the one or more other channels using a number of APs that is different to the number of physical antennas.

It is noted that, in an alternative example, the number of APs used for one or more other channels (such as the NB-PDCCH or NB-PDSCH) may be indicated in a different manner, such as via the system information block (SIB). In this case, the system information block (SIB) would also be transmitted using the known number of APs. SIB is transmitted in multiple parts (SIB1, SIB2, etc.). Any SIB that is transmitted before the indication of the number of APs is indicated would be transmitted using the known number of APs in this example.

In one embodiment, the number of APs is fixed to 2 for the NB-PBCH, regardless of the number of APs used by the eNB for other channels. For the case where 2 (or more) physical antennas are used, then SFBC is applied as usual. For the case where a single physical antenna is used, then a form of antenna port virtualisation is used, an example of which is schematically shown in FIG. 8.

Figure 8:
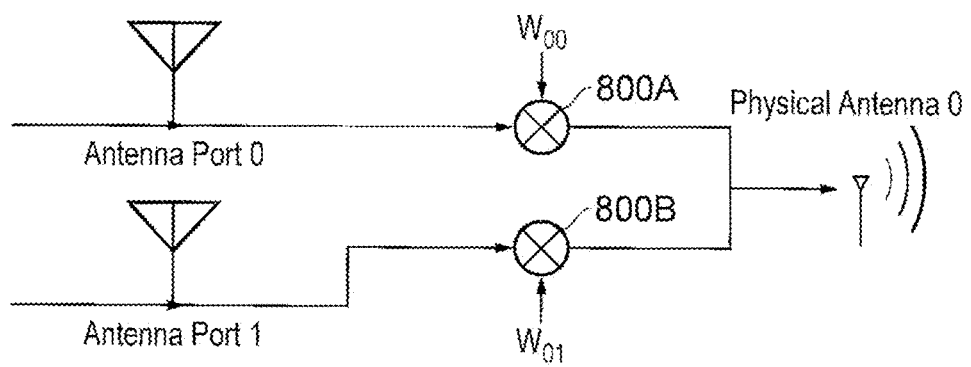
FIG. 8 is a schematic representation of a second arrangement of antenna ports and physical antennas.

As shown in FIG. 8, the signal from each AP (AP0 and AP1) is transmitted over one physical antenna (Physical Antenna 0). More specifically, the NB-RS for each of AP0 and AP1 are transmitted from the same physical antenna. The NB-RS for each of AP0 and AP1 can be associated with a different respective sequence (the "sequence" being a known sequence of modulated symbols), thus allowing the UE to perform channel estimation. For example, consider again the example NB-RS pattern of FIG. 7A when all 16 NB-RS are transmitted from a single physical transmit antenna (instead of 8 NB-RS representing AP0 being transmitted from a first physical antenna, and 8 NB-RS representing AP1 being transmitted from a second physical antenna). In this case, the UE 104 is not aware that the NB-RS of two APs are transmitted using the same physical antenna. Rather, the UE will still assume that there are 8 NB-RS for AP0 and 8 NB-RS for AP1 and perform SFBC (although, in this case, the UE is not likely to benefit from any SFBC gain, an SFBC gain normally being achieved when there are plural over-the-air channels between a plurality of eNB transmit physical antennas and any receive physical antenna at the UE).

Figure 9:
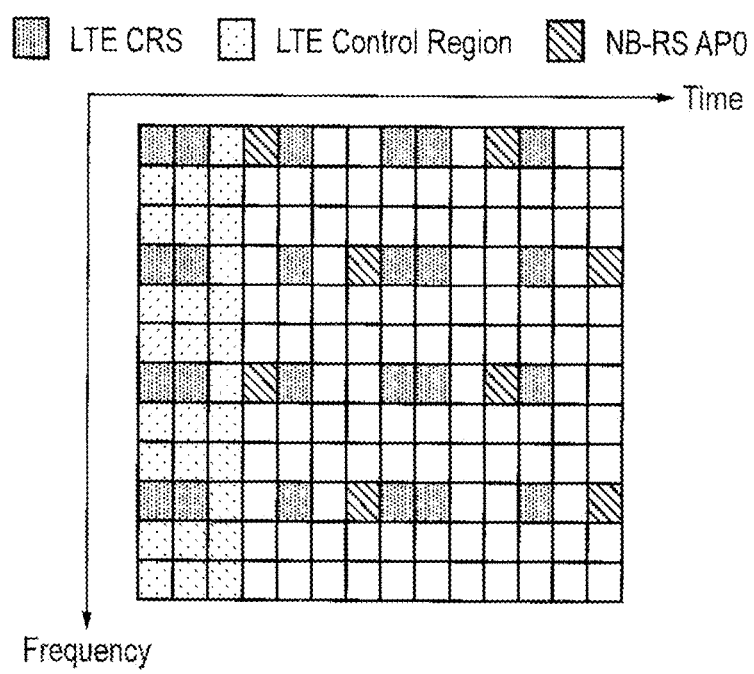
FIG. 9 is a schematic representation of a Narrow Band Internet of Things (NB-IoT) Physical Resource Block (PRB) comprising one set of Narrow Band Reference Signals (NB-RS)

For the case where the NB-PBCH is transmitted using two antenna ports and a single physical antenna (for example, according to the scheme illustrated in FIG. 8) and the other channels are transmitted using a single antenna port and a single physical antenna, then the subframe containing the NB-PBCH would contain a pattern of NB-RS according to FIGS. 7A-B and subframes containing other channels would contain a pattern of NB-RS according to FIG. 9. The other channels therefore benefit from having more REs available for data (in FIG. 9, 8 RE-s are used for NB-RS, whereas in FIGS. 7A-B, 16 RE are used for NB-RS, meaning there are fewer RE available for data in FIGS. 7A-B).

In the case that a signal from each AP (AP0 and AP1) is transmitted over one physical antenna, the following power allocations may be applied:

The eNB power is split 50% to AP0 and 50% to AP1. In this case, power will be transmitted on the NB-RS reference symbols for both AP0 and for AP1. This has the advantage of averaging the interference on the NB-RS reference symbols.

100% of the eNB transmit power is transmitted on AP0 and 0% on AP1 (or vice versa). In this case, power will only be transmitted on NB-RS reference symbols for AP0 (or AP1). This has an advantage from the perspective of interference (since different cells can be arranged to transmit power on either AP0 or AP1, allowing an operator to avoid power on NB-RS reference signals always interfering with power on NB-RS reference signals from other cells).

A ratio of x % of the eNB transmit power is transmitted on AP0 and (100−x) % is transmitted on AP1.

In any case, the power allocations may be implemented by applying weightings $W_{00}$ and $W_{01}$ to each signal output by AP0 and AP1, respectively (the weightings $W_{00}$ and $W_{01}$ being applied by multipliers 800A and 800B, respectively).

In the above, when modulation of NB-PBCH is limited to QPSK (Quadrature Phase Key Shifting), 100% of eNB transmit power may be transmitted on REs carrying NB-RS on each AP, even when only a proportion of eNodeB transmit power is transmitted per AP on other REs. In a particular embodiment, the eNodeB transmits both the first signal and the second signal using two antenna ports and a single physical antenna element. It then doesn't need to signal to the UE (since the UE knows that two APs are used for both the first signal and second signal) the number of antenna ports that are used for the second signal.

In an embodiment, both the NB-PBCH and other channels are transmitted using the antenna arrangement shown in FIG. 8 and the frame structure shown in FIGS. 7A-B.

It is noted that, in general, another characteristic (such as a phase rotation and magnitude, or other suitable weight vector) can be made different for each of the AP0 and AP1 signals. This provides a way of differentiating the NB-RS for each of AP0 and AP1 even though they are transmitted using the same, single antenna. In general, the weightings $W_{00}$ and $W_{01}$ or other suitable weight vectors may take the form of complex coefficients (appreciating that a complex coefficient may be equivalent to a real coefficient when the imaginary component of the complex coefficient is zero).

In another embodiment, the number of APs is fixed to 1 for NB-PBCH, regardless of the number of APs used by the eNB for other channels. That is, if 1 AP is used for other downlink channels (NB-PDCCH & NB-PDSCH), then the NB-PBCH transmission goes through this single AP and if 2 APs are available and are used for the other downlink channels (NB-PDCCH & NB-PDSCH), then the eNB can select one of these 2 APs for the NB-PBCH transmission. Thus, the eNB always uses 1 AP for NB-PBCH. If one physical antenna is available, then signals from this single AP are transmitted over this one physical antenna. If there are two or more physical antennas, then the signals from this single AP can be transmitted over a subset of the physical antennas or all the physical antennas. For example, if there are two physical antennas (as would be the case, for example, if an eNB comprised only AP0 and Physical Antennas 1 and 2 shown in FIG. 6), the two physical transmit antennas can be combined into 1 AP by, using a suitable precoding technique. The number of physical transmit antennas used by the eNB 101 in this case is transparent to the UE 104, and only 1 set of NB-RS is transmitted for NB-PBCH, as schematically shown in FIG. 9 (in this case, the only AP is AP0, and thus only the NB-RS for AP0 are transmitted). It will be appreciated that when 1 AP is used (rather than 2 APs), there are more REs available for transmitting other data (in particular, 8 more REs are available for transmitting data, since the 8 REs that would have been used for transmitting the 8 NB-RS of the second AP are no longer required for this purpose).

It will thus be appreciated that embodiments of the present technique remove the need for the UE to blind decode the number of APs used for transmitting the NB-PBCH, since this number will be fixed in the NB-IoT specifications. Once the UE decodes the NB-PBCH, the MIB (carried by the NB-PBCH) or SIB then indicates the number of APs used for the other downlink channels, and the UE then operates under 1 AP (using a single antenna port transmission scheme to decode data) or 2 APs (using an SFBC transmission scheme to decode data) on the other downlink channels. By allowing for a different number of antenna ports on other channels, then a single AP can be used for transmitting channels other than the NB-PBCH and a smaller number of resource elements can be applied to the NB-RS for that single antenna port (as previously mentioned, two APs require 16 RE to be used in total for NB-RS, whereas one AP only requires 8 RE to be used in total for NB-RS).

Alternatively, in another example, if the other downlink channels (following NB-PBCH transmission) use the same number of APs as the NB-PBCH (there is no need for the eNB to provide extra signalling detailing the number of AP which apply for the other downlink channels. This is in addition to the fact that there is no need for the UE to blind decode the number of APs (since it will be fixed in the NB-IoT specifications, as previously explained). The signalling which must be transmitted to the UE 104 is therefore reduced, thus allowing the complexity of the UE 104 to be reduced even further.

It will be appreciated that although, in the above description, an SFBC transmission scheme is used when there are 2 or more APs, other schemes could also be used. For example, a beamforming transmission scheme (in which a different beam is applied to the signal associated with each respective AP) could be used. In particular, such a beamforming transmission scheme may be used when transmitting signals on the NB-PDCCH or NB-PD SCH.

It will be appreciated that although, in the above description, each of the antenna ports is said to be associated with one or more physical antennas, in a more general sense, in embodiments, each of the antenna ports may be associated with one or more physical antenna elements. A physical antenna element is an independent electrically active element which is able to convert electrical power into radio waves (and vice versa). A single physical antenna may comprise a single physical antenna element. Alternatively, a single physical antenna may comprise a plurality of physical antenna elements (for example, a cross-polarised antenna may comprise two physical antenna elements).

It will therefore be appreciated that, in general, embodiments of the present technique provide a terminal device (such as UE 104) for use with a wireless telecommunications network. The terminal device comprises a receiver (such as receiver 402) configured to receive a first signal (over the NB-PBCH, for example), the first signal being transmitted using a first number of antenna ports and encoded according to the first number of antenna ports (for example, using a single antenna port transmission scheme in the case that there is one antenna port and using an SFBC transmission scheme when there are two antenna ports). The first number of antenna ports is predetermined (that is, known to the terminal device in advance). The receiver is also configured to receive a second signal (over the NB-PDCCH or NB-PDSCH, for example), the second signal being transmitted using a second number of antenna ports and encoded according to the second number of antenna ports (again, for example, using a single antenna port transmission scheme in the case that there is one antenna port and using an SFBC or beamforming transmission scheme when there are two antenna ports). The second number of antenna ports is indicated by the first signal (for example, in the MIB). The terminal device also comprises a controller (such as controller 403) configured to decode the first signal using the predetermined first number of antenna ports, and decode the second signal using the second number of antenna ports indicated by the first signal. In an embodiment, the predetermined first number of antenna ports is stored in a storage medium (not shown) forming part of the controller of the terminal device. In an embodiment, the terminal device is an NB-IoT terminal device.

Furthermore, it will be appreciated that, in general, other embodiments of the present technique provide infrastructure equipment (such as eNB 101) for use with a wireless telecommunications network. The infrastructure equipment comprises a controller (such as controller 413) and a transmitter (such as transmitter 411). The transmitter is configured to transmit a first signal (over the NB-PBCH, for example) to a terminal device (such as UE 104) of the wireless telecommunications network. The first signal is transmitted using a first number of antenna ports and is encoded by the controller according to the first number of antenna ports (for example, using a single antenna port transmission scheme in the case that there is one antenna port and using an SFBC transmission scheme when there are two antenna ports). The first number of antenna ports is predetermined (that is, known to both the terminal device and infrastructure equipment in advance). The transmitter is also configured to transmit a second signal (over the NB-PDCCH or NB-PDSCH, for example) to the terminal device of the wireless telecommunications network. The second signal is transmitted using a second number of antenna ports and is encoded by the controller according to the second number of antenna ports (again, for example, using a single antenna port transmission scheme in the case that there is one antenna port and using an SFBC or beamforming transmission scheme when there are two antenna ports). The second number of antenna ports is indicated by the first signal (for example, in the MIB). In an embodiment, the predetermined first number of antenna ports is stored in a storage medium (not shown) forming part of the controller of the terminal device. In an embodiment, the infrastructure equipment is an NB-IoT terminal device.

In an embodiment, the transmitter of the infrastructure equipment comprises one or more physical antenna elements, and each antenna port via which the first and second signals are transmitted is associated with one or more of the physical antenna elements.

In particular, there may be two antenna ports associated with each of the physical antenna elements (for example, there may be a single physical antenna element and the number of antenna ports may be two (as exemplified in FIG. 8, for example). When transmitting the first signal, a signal from each of the two antenna ports associated with each physical antenna element is transmitted using that physical antenna element. In this case, the controller is configured to apply a complex coefficient to the signal of each of the antenna ports prior to transmission of that signal using the physical antenna element associated with that antenna port. In one embodiment, the transmitter is associated with a total available transmit power, the total available transmit power representing the total output signal transmission power available to the transmitter. The complex coefficient applied to the signal of each of the antenna ports may then serve to allocate a portion of the total available transmit power to each of the signals according to a predetermined ratio (in this case, the complex coefficients are the weightings $W_{00}$ and $W_{01}$, for example). The signal of each of the antenna ports may be allocated an equal portion of the total available transmit power (so that the signals of AP0 and AP1 in FIG. 8 are each allocated 50% of the total available transmit power, for example). Alternatively, a signal of one of the antenna ports may be allocated the entirety of the total transmit power (so that, for example, the signal of AP0 in FIG. 8 is allocated 100% of the total available transmit power whilst the signal of AP1 is allocated 0% of the total available transmit power, or vice versa).

Alternatively, the transmitter may comprise a number of physical antenna elements greater than the number of antenna ports. In this case, when transmitting the first signal, a signal from one of the antenna ports is transmitted using a plurality of the physical antenna elements in accordance with a precoding scheme. Such an example is given with reference to FIG. 6.

It is noted that, in an example embodiment, the arrangement of antenna ports, physical antennas and multipliers shown in FIGS. 6 and 8 may be implemented using the controller of the infrastructure equipment in combination with the transmitter of the infrastructure equipment using any suitable implementation. For example, the controller may comprise the antenna ports and multipliers, whereas the transmitter may comprise the physical antenna elements.

Figure 10:
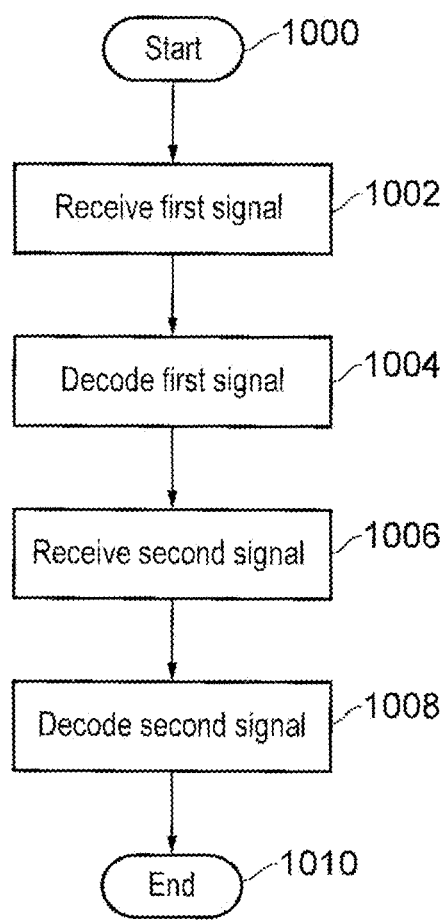
FIG. 10 is a flow chart schematically illustrating a first method according to an embodiment of the present technique.

FIG. 10 shows a flow chart schematically illustrating a method according to an embodiment of the present technique. The method of FIG. 10 is implemented by the controller of the terminal device (for example, the controller 403 of the UE 104). The method starts at step 1000. At step 1002, the receiver (for example, the receiver 402) is controlled to receive the first signal. At step 1004, the first signal is decoded using the predetermined first number of antenna ports. At step 1006, the receiver is controlled to receive the second signal. At step 1008, the second signal is decoded using the second number of antenna ports indicated by the first signal. The method ends at step 1010.

Figure 11:
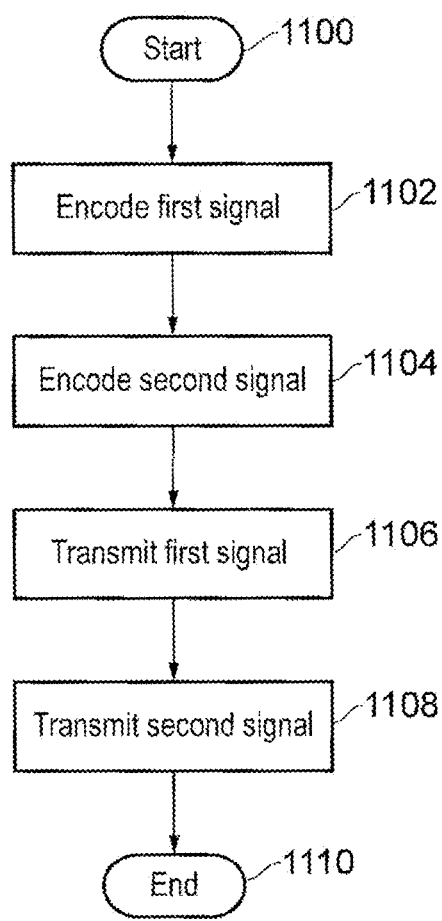
FIG. 11 is a flow chart schematically illustrating a second method according to an embodiment of the present technique.

FIG. 11 shows a flow chart schematically illustrating another method according to an embodiment of the present technique. The method of FIG. 11 is implemented by the controller of the infrastructure equipment (for example, the controller 413 of the eNB 101). The method starts at step 1100. At step 1102, the first signal is encoded according to the predetermined first number of antenna ports. At step 1104, the second signal is encoded according to the second number of antenna ports, the second number of antenna ports being indicated by the first signal. At step 1106, the transmitter (for example, the transmitter 411) is controlled to transmit the first signal. At step 1108, the transmitter is controlled to transmit the second signal. The method ends at step 1110.

As should be clear from the above-mentioned description, in specific embodiments of the present technique, the first signal (transmitted via the NB-PDCH, for example) may be transmitted using one or two APs and will be encoded according to the number of APs used for this transmission. The number of APs (that is, one or two) is a predetermined value. The second signal (transmitted via the NB-PDCCH or NB-PDSCH) is then transmitted and encoded using one or two APs, the number of APs used for transmission and encoding being specified in by the first signal. Any number of physical antenna elements may be used, including a single physical antenna element (as described with reference to FIG. 8, for example). In a particular embodiment, the first signal is transmitted using two APs and the second signal is transmitted using one or two APs. More particularly, if the second signal is transmitted using one AP, then more REs are made available for other uses, as previously explained.

Various features of embodiments of the present technique are defined by the following numbered clauses:

1. A terminal device for use with a wireless telecommunications network, the terminal device comprising:
   a receiver configured:
   to receive a first signal, the first signal being transmitted using a first number of antenna ports and encoded according to the first number of antenna ports, the first number of antenna ports being predetermined, and
   to receive a second signal, the second signal being transmitted using a second number of antenna ports and encoded according to the second number of antenna ports, the second number of antenna ports being indicated by the first signal; and
   a controller configured to decode the first signal using the predetermined first number of antenna ports, and decode the second signal using the second number of antenna ports indicated by the first signal.

2. A terminal device according to clause 1, wherein the first signal is transmitted using a Narrow Band Physical Broadcast Channel (NB-PBCH), and the second signal is transmitted using one of a Narrow Band Physical Downlink Control Channel (NB-PDCCH) and a Narrow Band Physical Downlink Shared Channel (NB-PDSCH).

3. A terminal device according to clause 2, wherein each of the antenna ports via which the first signal is transmitted is associated with a respective set of Narrow Band Reference Signals (NB-RS).

4. A terminal device according to any preceding clause, wherein:
when the first or second number of antenna ports is one, the first or second signal, respectively, is encoded and decoded using a single antenna port transmission scheme; and
when the first or second number of antenna ports is two or more, the first or second signal, respectively, is encoded and decoded using one of a Space-Frequency Block Code (SFBC) transmission scheme or a beamforming transmission scheme in which a different beam is applied to each respective antenna port.

5. A terminal device according to any preceding clause, wherein each antenna port via which the first and second signals are transmitted is associated with one or more physical antenna elements.

6. A terminal device according to any preceding clause, wherein the terminal device is a Narrow Band Internet of Things (NB-IoT) terminal device.

7. Infrastructure equipment for use with a wireless telecommunications network, the infrastructure equipment comprising:
a controller; and
a transmitter configured:
to transmit a first signal to a terminal device of the wireless telecommunications network, the first signal being transmitted using a first number of antenna ports and being encoded by the controller according to the first number of antenna ports, the first number of antenna ports being predetermined, and
to transmit a second signal to the terminal device of the wireless telecommunications network, the second signal being transmitted using a second number of antenna ports and being encoded by the controller according to the second number of antenna ports, the second number of antenna ports being indicated by the first signal.

8. Infrastructure equipment according to clause 7, wherein the first signal is transmitted using a Narrow Band Physical Broadcast Channel (NB-PBCH), and the second signal is transmitted using one of a Narrow Band Physical Downlink Control Channel (NB-PDCCH) and a Narrow Band Physical Downlink Shared Channel (NB-PDSCH).

9. Infrastructure equipment according to clause 8, wherein each of the antenna ports via which the first signal is transmitted is associated with a respective set of Narrow Band Reference Signals (NB-RS).

10. Infrastructure equipment according to any one of clauses 7 to 9, wherein:
when the first or second number of antenna ports is one, the first or second signal, respectively, is encoded using a single antenna port transmission scheme; and
when the first or second number of antenna ports is two, the first or second signal, respectively, is encoded using one of a Space-Frequency Block Code (SFBC) transmission scheme or a beamforming transmission scheme in which a different beam is applied to each respective antenna port.

11. Infrastructure equipment according to any one of clauses 7 to 10, wherein the transmitter comprises one or more physical antenna elements, and each antenna port via which the first and second signals are transmitted is associated with one or more of the physical antenna elements.

12. Infrastructure equipment according to clause 11, wherein:
there are two antenna ports associated with each of the physical antenna elements;
when transmitting the first signal, a signal from each of the two antenna ports associated with each physical antenna element is transmitted using that physical antenna element; and
the controller is configured to apply a complex coefficient to the signal of each of the antenna ports prior to transmission of that signal using the physical antenna element associated with that antenna port.

13. Infrastructure equipment according to clause 12, wherein:
the transmitter is associated with a total available transmit power, the total available transmit power representing the total output signal transmission power available to the transmitter; and
the complex coefficient applied to the signal of each of the antenna ports serves to allocate a portion of the total available transmit power to each of the signals according to a predetermined ratio.

14. Infrastructure equipment according to clause 13, wherein the signal of each of the antenna ports is allocated an equal portion of the total available transmit power.

15. Infrastructure equipment according to clause 14, wherein a signal of one of the antenna ports is allocated the entirety of the total available transmit power.

16. Infrastructure equipment according to clause 11, wherein the transmitter comprises a number of physical antenna elements greater than the number of antenna ports; and
when transmitting the first signal, a signal from one of the antenna ports is transmitted using a plurality of the physical antenna elements in accordance with a precoding scheme.

17. Infrastructure equipment according to any one of clauses 7 to 16, wherein the infrastructure equipment is a Narrow Band Internet of Things (NB-IoT) infrastructure equipment and the terminal device is an NB-IoT terminal device.

18. A method of controlling a terminal device for use with a wireless telecommunications network, the method comprising:
controlling a receiver of the terminal device to receive a first signal, the first signal being transmitted using a first number of antenna ports and encoded according to the first number of antenna ports, the first number of antenna ports being predetermined, and
controlling the receiver to receive a second signal, the second signal being transmitted using a second number of antenna ports and encoded according to the second number of antenna ports, the second number of antenna ports being indicated by the first signal; and
decoding the first signal using the predetermined first number of antenna ports, and decoding the second signal using the second number of antenna ports indicated by the first signal.

19. A method of controlling infrastructure equipment for use with a wireless telecommunications network, the method comprising:
controlling a transmitter of the infrastructure equipment to transmit a first signal to a terminal device of the wireless telecommunications network, the first signal being transmitted using a first number of antenna ports and being encoded according to the first number of antenna ports, the first number of antenna ports being predetermined, and controlling the transmitter to transmit a second signal to the terminal device of the wireless telecommunications network, the second signal being transmitted using a second number of antenna ports and being encoded according to the second number of antenna ports, the second number of antenna ports being indicated by the first signal.

20. Integrated circuitry for a terminal device for use with a wireless telecommunications network, the integrated circuitry comprising a receiver element configured to receive a first signal, the first signal being transmitted using a first number of antenna ports and encoded according to the first number of antenna ports, the first number of antenna ports being predetermined, and to receive a second signal, the second signal being transmitted using a second number of antenna ports and encoded according to the second number of antenna ports, the second number of antenna ports being indicated by the first signal; and a controller element configured to decode the first signal using the predetermined first number of antenna ports, and decode the second signal using the second number of antenna ports indicated by the first signal.

21. Integrated circuitry for infrastructure equipment for use with a wireless telecommunications network, the integrated circuitry comprising a controller element; and a transmitter element configured to transmit a first signal to a terminal device of the wireless telecommunications network, the first signal being transmitted using a first number of antenna ports and being encoded by the controller element according to the first number of antenna ports, the first number of antenna ports being predetermined, and to transmit a second signal to the terminal device of the wireless telecommunications network, the second signal being transmitted using a second number of antenna ports and being encoded by the controller element according to the second number of antenna ports, the second number of antenna ports being indicated by the first signal.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH. Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69
[3] R1-157783, "Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, RAN1#83

The invention claimed is:

1. A terminal device for use with a wireless telecommunications network, the terminal device comprising:
    a receiver configured:
        to receive a first signal, the first signal being transmitted using a first number of antenna ports and encoded according to the first number of antenna ports, the first number of antenna ports being fixed, and
        to receive a second signal, the second signal being transmitted using a second number of antenna ports and encoded according to the second number of antenna ports, the second number of antenna ports being indicated by the first signal; and
    a controller configured to decode the first signal using the fixed first number of antenna ports, and decode the second signal using the second number of antenna ports indicated by the first signal.

2. The terminal device according to claim 1, wherein the first signal is transmitted using a Narrow Band Physical Broadcast Channel (NB-PBCH), and the second signal is transmitted using one of a Narrow Band Physical Downlink Control Channel (NB-PDCCH) and a Narrow Band Physical Downlink Shared Channel (NB-PDSCH).

3. The terminal device according to claim 2, wherein each of the fixed first number of antenna ports via which the first signal is transmitted is associated with a respective set of Narrow Band Reference Signals (NB-RS).

4. The terminal device according to claim 1, wherein:
when the first or second number of antenna ports is one, the first or second signal, respectively, is encoded and decoded using a single antenna port transmission scheme; and
when the first or second number of antenna ports is two or more, the first or second signal, respectively, is encoded and decoded using one of a Space-Frequency Block Code (SFBC) transmission scheme or a beamforming transmission scheme in which a different beam is applied to each respective antenna port.

5. The terminal device according to claim 1, wherein each antenna port via which the first and second signals are transmitted is associated with one or more physical antenna elements.

6. The terminal device according to claim 1, wherein the terminal device is a Narrow Band Internet of Things (NB-IoT) terminal device.

7. Infrastructure equipment for use with a wireless telecommunications network, the infrastructure equipment comprising:
a controller; and
a transmitter configured:
to transmit a first signal to a terminal device of the wireless telecommunications network, the first signal being transmitted using a first number of antenna ports and being encoded by the controller according to the first number of antenna ports, the first number of antenna ports being fixed, and
to transmit a second signal to the terminal device of the wireless telecommunications network, the second signal being transmitted using a second number of antenna ports and being encoded by the controller according to the second number of antenna ports, the second number of antenna ports being indicated by the first signal.

8. The infrastructure equipment according to claim 7, wherein the first signal is transmitted using a Narrow Band Physical Broadcast Channel (NB-PBCH), and the second signal is transmitted using one of a Narrow Band Physical Downlink Control Channel (NB-PDCCH) and a Narrow Band Physical Downlink Shared Channel (NB-PDSCH).

9. The infrastructure equipment according to claim 8, wherein each of the fixed first number of antenna ports via which the first signal is transmitted is associated with a respective set of Narrow Band Reference Signals (NB-RS).

10. The infrastructure equipment according to claim 7, wherein:
when the first or second number of antenna ports is one, the first or second signal, respectively, is encoded using a single antenna port transmission scheme; and
when the first or second number of antenna ports is two, the first or second signal, respectively, is encoded using one of a Space-Frequency Block Code (SFBC) transmission scheme or a beamforming transmission scheme in which a different beam is applied to each respective antenna port.

11. The infrastructure equipment according to claim 7, wherein the transmitter comprises one or more physical antenna elements, and each antenna port via which the first and second signals are transmitted is associated with one or more of the physical antenna elements.

12. The infrastructure equipment according to claim 11, wherein:
there are two antenna ports associated with each of the physical antenna elements;
when transmitting the first signal, a signal from each of the two antenna ports associated with each physical antenna element is transmitted using that physical antenna element; and
the controller is configured to apply a complex coefficient to the signal of each of the antenna ports prior to transmission of that signal using the physical antenna element associated with that antenna port.

13. The infrastructure equipment according to claim 12, wherein:
the transmitter is associated with a total available transmit power, the total available transmit power representing the total output signal transmission power available to the transmitter; and
the complex coefficient applied to the signal of each of the antenna ports serves to allocate a portion of the total available transmit power to each of the signals according to a predetermined ratio.

14. The infrastructure equipment according to claim 13, wherein the signal of each of the antenna ports is allocated an equal portion of the total available transmit power.

15. The infrastructure equipment according to claim 14, wherein a signal of one of the antenna ports is allocated the entirety of the total available transmit power.

16. The infrastructure equipment according to claim 11, wherein
the transmitter comprises a number of physical antenna elements greater than the fixed first number of antenna ports; and
when transmitting the first signal, a signal from one of the antenna ports of the fixed first number of antenna ports is transmitted using a plurality of the physical antenna elements in accordance with a precoding scheme.

17. The infrastructure equipment according to claim 7, wherein the infrastructure equipment is a Narrow Band Internet of Things (NB-IoT) infrastructure equipment and the terminal device is an NB-IoT terminal device.

18. A method of controlling a terminal device for use with a wireless telecommunications network, the method comprising:
controlling a receiver of the terminal device to receive a first signal, the first signal being transmitted using a first number of antenna ports and encoded according to the first number of antenna ports, the first number of antenna ports being fixed, and
controlling the receiver to receive a second signal, the second signal being transmitted using a second number of antenna ports and encoded according to the second number of antenna ports, the second number of antenna ports being indicated by the first signal; and
decoding the first signal using the fixed first number of antenna ports, and decoding the second signal using the second number of antenna ports indicated by the first signal.

19. Integrated circuitry for a terminal device, the integrated circuitry comprising circuitry being configured to:
receive a first signal, the first signal being transmitted using a first number of antenna ports and encoded according to the first number of antenna ports, the first number of antenna ports being fixed;
receive a second signal, the second signal being transmitted using a second number of antenna ports and encoded according to the second number of antenna ports, the second number of antenna ports being indicated by the first signal; and decode the first signal using the fixed first number of antenna ports, and decode the second signal using the second number of antenna ports indicated by the first signal.

\* \* \* \* \*